(12) United States Patent
Soliman et al.

(10) Patent No.: US 11,734,423 B1
(45) Date of Patent: Aug. 22, 2023

(54) APPARATUS AND METHOD FOR MONITORING OF DATA FOR ATTACK DETECTION AND PREVENTION

(71) Applicant: Arctic Wolf Networks, Inc., Eden Prairie, MN (US)

(72) Inventors: Hazem Mohamed Ahmed Soliman, Toronto (CA); Niranjan Mayya, Mississauga (CA)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 0 days.

(21) Appl. No.: 18/050,398

(22) Filed: Oct. 27, 2022

(51) Int. Cl.
*G06F 21/55* (2013.01)
*G06F 21/57* (2013.01)

(52) U.S. Cl.
CPC .......... *G06F 21/554* (2013.01); *G06F 21/577* (2013.01); *G06F 2221/034* (2013.01)

(58) Field of Classification Search
CPC . G06F 21/554; G06F 21/577; G06F 2221/034
See application file for complete search history.

(56) References Cited

U.S. PATENT DOCUMENTS

| | | | | |
|---|---|---|---|---|
| 6,799,199 B1 * | 9/2004 | Segal | ................. | H04L 67/568 709/224 |
| 7,191,223 B1 * | 3/2007 | Zamir | ................. | H04L 12/1813 709/224 |
| 7,636,424 B1 * | 12/2009 | Halikhedkar | ........ | H04Q 3/0075 379/15.01 |
| 9,256,739 B1 * | 2/2016 | Roundy | .............. | H04L 63/1425 |
| 9,578,454 B1 * | 2/2017 | Fitch | ...................... | H04W 4/06 |
| 10,313,382 B2 | 6/2019 | Noel et al. | | |
| 10,771,492 B2 * | 9/2020 | Hudis | ...................... | H04L 63/14 |
| 10,785,239 B2 * | 9/2020 | Walsh | ................. | H04L 63/1416 |
| 10,812,499 B2 * | 10/2020 | Hassanzadeh | ...... | H04L 63/0227 |
| 10,986,012 B1 * | 4/2021 | Côté | ................... | H04L 43/0817 |
| 11,128,654 B1 * | 9/2021 | Joyce | ...................... | H04L 63/20 |
| 11,140,179 B1 | 10/2021 | Infante-Lopez et al. | | |
| 11,171,970 B2 | 11/2021 | Gamble | | |
| 11,201,890 B1 * | 12/2021 | Coull | .................. | H04L 63/1416 |

(Continued)

OTHER PUBLICATIONS

Cao, et al., On Preempting Advanced Persistent Threats Using Probabilistic Graphical Models, Mar. 21, 2019, 14 pages.

(Continued)

*Primary Examiner* — Meng Li
(74) *Attorney, Agent, or Firm* — Cooley LLP

(57) ABSTRACT

A stream of cybersecurity alerts is received. Each cybersecurity alert from the stream of cybersecurity alerts is associated with a set of attributes. Each cybersecurity alert from the stream of cybersecurity alerts is associated, based on the set of attributes and as that cybersecurity alert is received, to a bucket from a set of buckets. Each bucket from the set of buckets is associated with (1) an attribute from the set of attributes different than remaining buckets from the set of buckets and (2) a set cybersecurity alerts from the stream of cybersecurity alerts having the attribute. For each bucket from the set of buckets, a set of correlations between cybersecurity alerts included in the set of cybersecurity alerts for that bucket are determined, based on the set of cybersecurity alerts for that bucket, to generate an attack graph associated with that bucket.

20 Claims, 10 Drawing Sheets

(56) References Cited

U.S. PATENT DOCUMENTS

| | | | |
|---|---|---|---|
| 11,232,235 | B2 | 1/2022 | Hadar et al. |
| 11,416,874 | B1* | 8/2022 | Scotney .................. H04L 63/10 |
| 2019/0220190 | A1* | 7/2019 | He ......................... G06F 3/0652 |
| 2020/0202184 | A1* | 6/2020 | Shrestha ................. G06N 5/022 |
| 2021/0081539 | A1* | 3/2021 | Karin ..................... G06F 21/577 |
| 2021/0133331 | A1 | 5/2021 | Lipkis et al. |
| 2021/0203673 | A1 | 7/2021 | Dos et al. |
| 2021/0352096 | A1* | 11/2021 | Yadav .................. H04L 63/1433 |
| 2021/0357172 | A1* | 11/2021 | Sinesio ................... G06F 16/48 |
| 2022/0083553 | A1* | 3/2022 | Chavan .................. G06F 16/284 |
| 2022/0308763 | A1* | 9/2022 | Guilford ............. H03M 7/3088 |
| 2022/0337620 | A1* | 10/2022 | Hadden ............... H04L 63/1416 |
| 2023/0016689 | A1* | 1/2023 | Voltz ..................... H04L 9/3247 |

OTHER PUBLICATIONS

Microsoft_Security, Automating threat actor tracking: Understanding attacker behavior for intelligence and contextual alerting, Apr. 1, 2021, 16 pages.

Moskal, et al., Extracting and Evaluating Similar and Unique Cyber Attack Strategies from Intrusion Alerts, In2018 IEEE International Conference on Intelligence and Security Informatics (ISI), Nov. 9, 2018, pp. 49-54.

Nadeem, et al., Alert-Driven Attack Graph Generation Using S-PDFA, IEEE Transactions on Dependable and Secure Computing, Mar./Apr. 2022, 16 pages, vol. 19, No. 2.

Nadeem, et al., SAGE: Intrusion Alert-driven Attack Graph Extractor, In 2021 IEEE Symposium on Visualization for Cyber Security, Oct. 27, 2021, pp. 36-41.

Noel, et al., Correlating intrusion events and building attack scenarios through attack graph distances, 20th Annual Computer Security Applications Conference, Dec. 6, 2004, pp. 350-359.

Ren, et al., An Online Adaptive Approach to Alert Correlation, Detection of Intrusions and Malware, and Vulnerability, Assessment, DIMVA 2010, Lecture Notes in Computer Science, 2010, pp. pp. 153-172, vol. 6201.

Soliman, et al., RANK: AI-assisted End-to-End Architecture for Detecting Persistent Attacks in Enterprise Networks, Jan. 6, 2021, 14 pages.

Yang, et al., Near Real-time Learning and Extraction of Attack Models from Intrusion Alerts, Mar. 25, 2021, 9 pages.

* cited by examiner

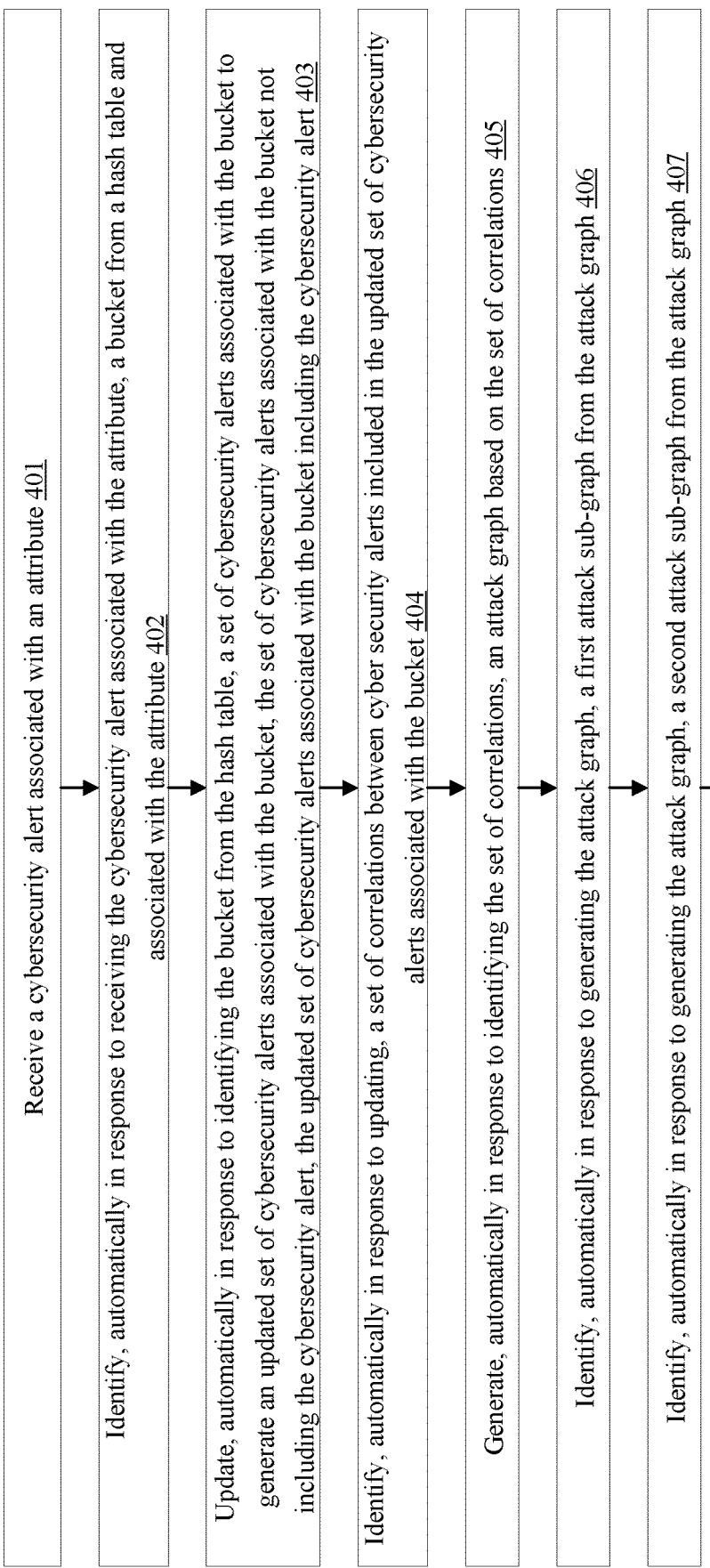

500

Receive a stream of cybersecurity alerts over a period of time 501

As each cybersecurity alert from the stream of cybersecurity alerts is received, identify a bucket associated with that cybersecurity alert, the bucket uniquely associated with an attribute, the cybersecurity alert associated with the attribute, the bucket associated with a set of cybersecurity alerts that includes that cyber security alert 502

As each cybersecurity alert from the stream of cybersecurity alerts is received, determine, based on the set of cybersecurity alerts, a set of correlations between cybersecurity alerts included in the set of cybersecurity alerts to update an attack graph associated with the set of cybersecurity alerts 503

As each cybersecurity alert from the stream of cybersecurity alerts is received, identify a set of attack sub-graphs from the attack graph 504

As each cyber security alert from the stream of cybersecurity alerts is received, determine, for each attack sub-graph from the set of attack sub-graphs, a maliciousness score associated with that attack sub-graph 505

In response to a maliciousness score from the set of maliciousness scores being outside a predetermined acceptable maliciousness score range, send a signal to cause at least one remedial action at a compute device associated with a cybersecurity user 506

FIG. 5

Receive a stream of cybersecurity alerts, each cybersecurity alert from the stream of cybersecurity alerts associated with a set of attributes 601

Associate, based on the set of attributes, each cybersecurity alert from the stream of cybersecurity alerts, as that cybersecurity alert is received, to a bucket from a set of buckets, each bucket from the set of buckets associated with (1) an attribute from the set of attributes different than remaining buckets from the set of buckets and (2) a set cybersecurity alerts from the stream of cybersecurity alerts having the attribute 602

For each bucket from the set of buckets, determine, based on the set of cybersecurity alerts for that bucket, a set of correlations between cybersecurity alerts included in the set of cybersecurity alerts for that bucket to generate an attack graph associated with that bucket 603

For each bucket from the set of buckets, partition, based on a linear greedy approach, the attack graph associated with that bucket to determine a set of attack sub-graphs within the attack graph associated with that bucket 604

Determine, for each attack sub-graph from the set of attack sub-graphs, and to generate a set of maliciousness scores, a maliciousness score associated with that attack sub-graph 605

In response to a maliciousness score from the set of maliciousness scores being outside a predetermined acceptable maliciousness score range, send a signal to cause at least one remedial action 606

FIG. 6

APPARATUS AND METHOD FOR MONITORING OF DATA FOR ATTACK DETECTION AND PREVENTION

FIELD

One or more embodiments are related to an apparatus and method for monitoring of data for attack detection and prevention.

BACKGROUND

As cybersecurity attacks increase in complexity, the amount of data collected to monitor and counter such attacks can increase. As such, an increased number of false-positive cybersecurity alerts can occur, and fatigue on behalf of cybersecurity analysts tasked with monitoring the increased number of false-positive cybersecurity alerts can increase.

SUMMARY

In an embodiment, an apparatus includes a memory and a processor operatively coupled to the memory. The processor is configured to receive a cybersecurity alert associated with an attribute. The processor is further configured to identify, automatically in response to receiving the cybersecurity alert associated with the attribute, a bucket from a hash table and associated with the attribute. The processor is further configured to update, automatically in response to identifying the bucket from the hash table, a set of cybersecurity alerts associated with the bucket to generate an updated set of cybersecurity alerts associated with the bucket. The set of cybersecurity alerts associated with the bucket does not include the cybersecurity alert. The updated set of cybersecurity alerts associated with the bucket include the cybersecurity alert. The processor is further configured to identify, automatically in response to updating, a set of correlations between cybersecurity alerts included in the updated set of cybersecurity alerts associated with the bucket. The processor is further configured to generate, automatically in response to identifying the set of correlations, an attack graph based on the set of correlations. The processor is further configured to identify, automatically in response to generating the attack graph, a first attack subgraph from the attack graph. The processor is further configured to identify, automatically in response to generating the attack graph, a second attack subgraph from the attack graph. The processor is further configured to determine, automatically in response to generating the first attack subgraph, a maliciousness score associated with the first attack subgraph. The processor is further configured to determine, automatically in response to generating the second attack subgraph, a maliciousness score associated with the second attack subgraph. The processor is further configured to, in response to at least one of the maliciousness score associated with the first attack subgraph or the maliciousness score associated with the second attack subgraph being outside a predetermined acceptable maliciousness score range, send a signal to cause at least one remedial action at a compute device associated with a cybersecurity user.

In an embodiment, a non-transitory processor-readable medium stores code representing instructions to be executed by one or more processors. The instructions comprise code to cause the one or more processors to receive a stream of cybersecurity alerts over a period of time. The instructions further comprise code to cause the one or more processors to, as each cybersecurity alert from the stream of cybersecurity alerts is received, identify a bucket associated with that cybersecurity alert. The bucket is uniquely associated with an attribute. The cybersecurity alert is associated with the attribute. The bucket is associated with a set of cybersecurity alerts that includes that cybersecurity alert. The instructions further comprise code to cause the one or more processors to, as each cybersecurity alert from the stream of cybersecurity alerts is received, determine, based on the set of cybersecurity alerts, a set of correlations between cybersecurity alerts included in the set of cybersecurity alerts to update an attack graph associated with the set of cybersecurity alerts. The instructions further comprise code to cause the one or more processors to, as each cybersecurity alert from the stream of cybersecurity alerts is received, identify a set of attack subgraphs from the attack graph. The instructions further comprise code to cause the one or more processors to, as each cybersecurity alert from the stream of cybersecurity alerts is received, determine, for each attack subgraph from the set of attack subgraphs and to generate a set of maliciousness scores, a maliciousness score associated with that attack subgraph. The instructions further comprise code to cause the one or more processors to, in response to a maliciousness score from the set of maliciousness scores being outside a predetermined acceptable maliciousness score range, send a signal to cause at least one remedial action at a compute device associated with a cybersecurity user.

In an embodiment, a method includes receiving, via a processor, a stream of cybersecurity alerts. Each cybersecurity alert from the stream of cybersecurity alerts is associated with a set of attributes. The method further includes associating, via the processor and based on the set of attributes, each cybersecurity alert from the stream of cybersecurity alerts, as that cybersecurity alert is received, to a bucket from a set of buckets. Each bucket from the set of buckets is associated with (1) an attribute from the set of attributes different than remaining buckets from the set of buckets and (2) a set cybersecurity alerts from the stream of cybersecurity alerts having the attribute. The method further includes, for each bucket from the set of buckets, determining, via the processor and based on the set of cybersecurity alerts for that bucket, a set of correlations between cybersecurity alerts included in the set of cybersecurity alerts for that bucket to generate an attack graph associated with that bucket. The method further includes, for each bucket from the set of buckets, partitioning, via the processor and based on a linear greedy approach, the attack graph associated with that bucket to determine a set of attack subgraphs within the attack graph associated with that bucket. The method further includes determining, via the processor, for each attack subgraph from the set of attack subgraphs, and to generate a set of maliciousness scores, a maliciousness score associated with that attack subgraph. The method further includes, in response to a maliciousness score from the set of maliciousness scores being outside a predetermined acceptable maliciousness score range, sending, via the processor, a signal to cause at least one remedial action.

BRIEF DESCRIPTION OF THE DRAWINGS

FIGS. 4A-4B show a flowchart of a method for identifying attack subgraphs from an attack graph, according to an embodiment.

FIG. 5 shows a flowchart of a method for identifying attack subgraphs from an attack graph, according to an embodiment.

FIG. 6 shows a flowchart of a method for identifying attack subgraphs from an attack graph, according to an embodiment.

DETAILED DESCRIPTION

Figure 1:
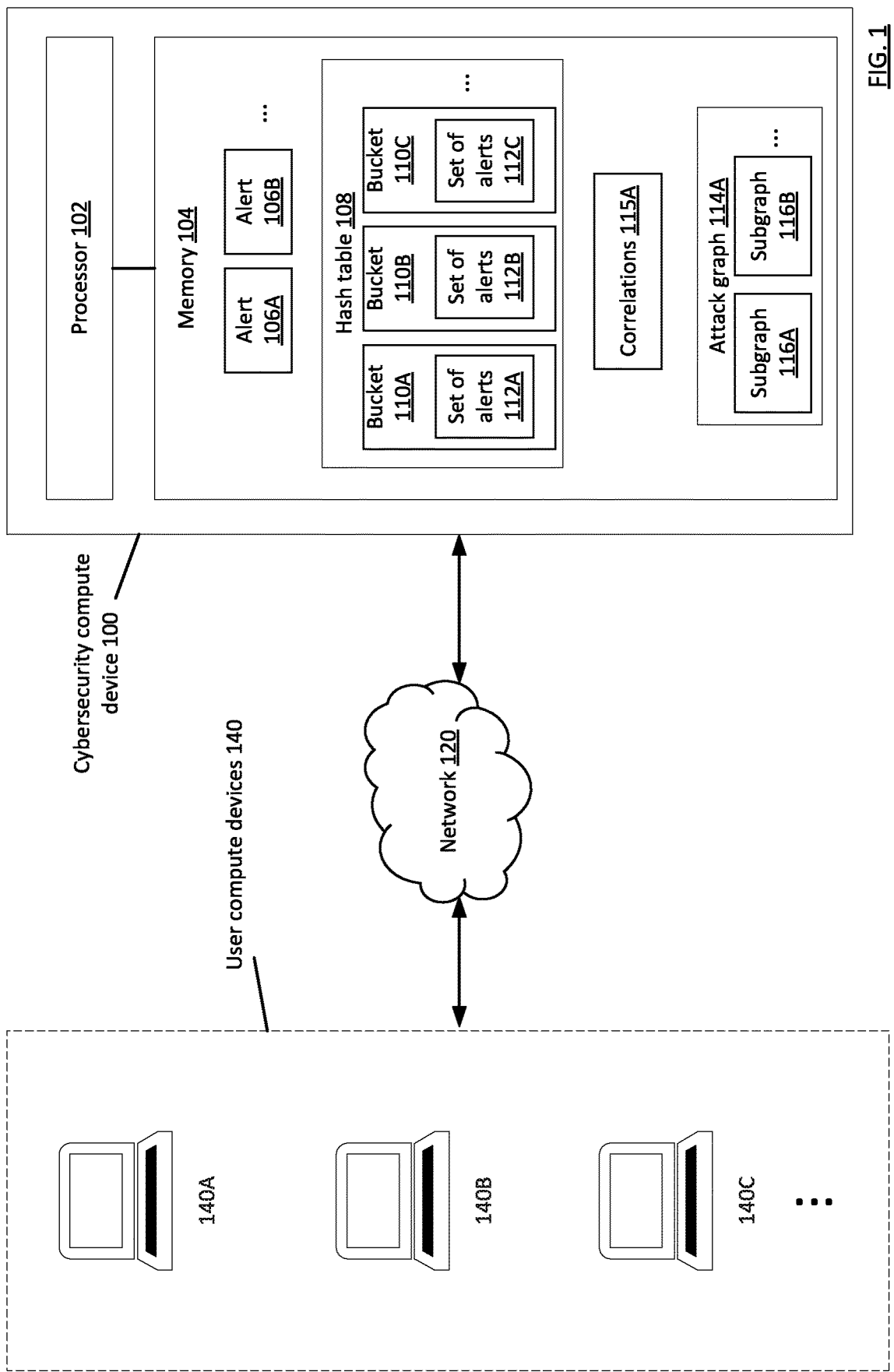
FIG. 1 shows a block diagram of a system for analyzing alerts to identify a potentially malicious attack, according to an embodiment.

Some implementations are related to taking an input of a sequence of alerts (e.g., cybersecurity alerts) as they are generated and/or received. Alerts are then merged into generalized alerts sharing a common attribute(s), such as the same alert identifier (ID). In some implementations, an "attribute" refers to a piece of information that determines the properties of a field associated with an alert, a tag or key in a database (e.g., hash table), a string of characters (e.g., in a display), and/or the like. Additionally, in some implementations, older alerts can potentially be deleted (e.g., according to a predetermined, customized time window). Generalized alerts can be connected together into an attack graph containing potentially all alerts for a single network environment via a correlating step(s). The resulting graph of generalized alerts can then be partitioned into multiple subgraphs, each representing a separate attack campaign. Graph construction and partitioning can be performed with increased efficiency by leveraging hashing. Each campaign can be scored, and those with scores outside a predetermined acceptable range can be presented to an analyst for further investigation.

In some implementations, alerts are received as a stream of alerts. As each alert is received, if an incoming alert matches an existing one, the two are merged together through updating the existing alert with the attributes of the new one (e.g., date received/generated). An identifier-based merging can be implemented. For each identifier-based merging, each alert can be associated with an identifier and comprise values from fields such as user account, IP address, description, customer name, and/or the like. Said similarly, values from these fields are concatenated together to form the identifier for a given alert. As an example, a field may be user account, and values can be JSmith, JDoe, BJones, etc. As another example, a field may be customer name and values can be Jack Smith, Karen Kennedy, Will Johnson, etc. For each newly arriving alert, its identifier is looked up in a database, such as a hash table. If the identifier exists, the two alerts, existing and new, are merged together and the field values updated accordingly. Otherwise, the new alert is added to the hash table. This approach, performed as each alert is received (e.g., in real-time or substantially real-time), can help to ensure consistent time look up, and avoid the potentially expensive step of template extraction.

In some implementations, a hash-map is maintained containing buckets of alerts (e.g., for each hour, for each day, for each week, etc.). Alerts that have been received and/or generated for an amount of time greater than a predetermined threshold can be deleted; deleting such older alerts can limit an indefinite growth of alerts over time. In some instances, a hash-map refers to a data structure that provides virtually direct access to objects (e.g., alerts) based on a unique string or integer. The hash-map may use a hash function to compute an index into an array of buckets (e.g., hash buckets) from which a desired value can be found. The array of buckets can be used to apportion objects for sorting or lookup purposes.

In some implementations, the IP addresses and usernames are parsed from each alert as the alert is received. Two sets of hash maps can be maintained containing buckets of alerts associated with each IP address or username. The extracted IP address(es) and username(s) from the new alert can be used to identify which bucket of alerts should be checked for correlation with the incoming one.

In some implementations, for each bucket of alerts, all alerts within that bucket are tested for correlation. In some implementations, testing for correlation includes taking the MITRE® mappings for each alert into account, and determining the presence or absence of a graph and/or edge connecting two edges (e.g., alerts). In some instances, a node refers to an alert, an edge refers to a connection between two alerts determined to be correlated, and a graph refers to a group of nodes that are interconnected via one or more (e.g., 1, 2, 5, 10, 100, etc.) edges.

In some implementations, a set of graph partitions is maintained. Once graph edges have been determined, taking into account the new alert, a linear greedy algorithm for example can be used to determine a graph partition for the new alert.

In some implementations, features are maintained for each graph partition, such as which MITRE ATT&CK® tactics are present and/or the types of alerts included. These features are then used to predict a maliciousness score for each graph partition. In some implementations, graph partitions that exceed a certain maliciousness score are presented to an analyst. In some implementations, each alert is equipped, when presented to the analyst, with the graph partition containing it.

FIG. 1 shows a block diagram of a system for analyzing alerts to identify a potentially malicious attack, according to an embodiment. FIG. 1 includes cybersecurity compute device 100 and user compute devices 140, each operatively coupled to one another via network 120.

The network 120 can be any suitable communications network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network 120 can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, the network 120 can include multiple networks or subnetworks operatively coupled to one another by, for example, network bridges, routers, switches, gateways and/or the like.

The user compute devices 140 can include multiple user compute devices, such as user compute device 140A, user compute device 140B, user compute device 140C, and/or the like. Though not explicitly shown in FIG. 1, each user compute device from user compute devices 140 can include a processor operatively coupled to a memory. The user compute devices 140 be any type of compute device, such as a server, desktop, laptop, tablet, mobile device, and/or the like. In some implementations, one or more users may use one or more user compute devices from user compute devices 140 to perform a cyber-attack.

In some implementations, a single user compute device from user compute devices 140 is used to perform a cyber-attack. In some implementations, multiple user compute devices from user compute devices 140 is used to perform a cyber-attack.

In some implementations, each user compute device from user compute devices 140 is associated with a user account, such as a user account that a user has logged into to operate that user compute device. For example, a first user is operating user compute device 140A with a first user account, a second user is operating user compute device 140B with a second user account, and a third user is operating user compute device 140C with a third user account.

In some implementations, each user compute device from user compute devices 140 is associated with an internet protocol (IP) address. For example, user compute device 140A is associated with a first IP address, user compute device 140B is associated with a second IP address, and user compute device 140C is associated with a third IP address.

In some implementations, as the user compute devices 140 perform activities (e.g., download files, modify files, runs commands, open certain files, deletes certain files, etc.), indications of those activities can be made known/determined by cybersecurity compute device 100.

The cybersecurity compute device 100 can be any type of compute device, such as a server, desktop, laptop, tablet, mobile device, and/or the like. The cybersecurity compute device 100 includes a processor 102 operatively coupled to a memory 104 (e.g., via a system bus). In some implementations, the cybersecurity compute device 100 can determine that a cyber-attack is occurring and/or likely is occurring, and can perform a remedial action. In some implementations, the cybersecurity compute device 100 can correlate alerts, such as cybersecurity alerts, based on common attributes to generate an attack graph.

The memory 104 of cybersecurity compute device 100 can include (e.g., store) representations of one or more alerts, such as alert 106A, alert 106B, and/or the like. In some implementations, each alert is a cybersecurity alert that is a brief, usually human-readable, technical notification regarding current vulnerabilities, exploits, and other security issues, such as for an activity that is potentially malicious and/or generated in response to a particular set of triggering actions (e.g., detection of certain telemetry data). Each alert can be associated with a set of attributes (e.g., known via metadata). For example, alert 106A can include indication of a first user account associated with (e.g., that caused) alert 106A and/or a first IP address associated with alert 106A, while alert 106B can include indication of a second user account associated with (e.g., that caused) alert 106B and/or a second IP address associated with alert 106B. Alerts can be obtained and/or received by cybersecurity compute device 100 in substantially real time (e.g., at machine speed) from user compute device 140 as each alert occurs. In other words, in some implementations, rather than cybersecurity compute device 100 receiving a batch of multiple alerts at once, cybersecurity compute device 100 can receive each alert in sequence as that alert occurs/is generated, similar to a stream of alerts.

The memory 104 of cybersecurity compute device 100 can include (e.g., store) representation of a hash table 108. The hash table 108 can include representation of buckets, such as bucket 110A, bucket 110B, bucket 110C, and/or the like. Each bucket can be associated with a set of alerts. For example, bucket 110A is associated with set of alerts 112A, bucket 110B is associated with set of alerts 112B, bucket 110C is associated with set of alerts 112C, etc.

Each bucket can be associated with an alert, such as an IP address or user account. Each bucket can further be associated with a set of alerts that have the same alert attribute as that bucket. For example, bucket 110A can be associated with (e.g., hold, be linked to, contain, etc.) a first attribute, such as a first user account. The set of alerts 112A for bucket 110A can include all alerts that have the first attribute, and not include alerts without the first attribute. Further, bucket 110B can be associated with a second attribute, such as a second user account different than the first user account. The set of alerts 112B for bucket 110B can include all alerts that have the second attribute, and not include alerts without the second attribute. Further, bucket 110C can be associated with a third attribute, such as an IP address or a third user different than the first user and the second user. The set of alerts 112C for bucket 110C can include all alerts that have the third attribute, and not include alerts without the third attribute. Note that, in some implementations, multiple hash tables can be stored in memory 104. For example, a hash table 108 can include all buckets associated with an IP address, while a second hash table different than hash table 108 can include all buckets associated with a user name.

As each alert is received, that alert can be included in one or more sets of alerts for one or more buckets that are associated with the same attribute. For example, where bucket 110A is associated with user account 1, bucket 110B is associated with user account 2, and bucket 110C is associated with IP address 192.158.1.38, and alert 106A is associated with user account 1 and IP address 192.158.1.38 (but not user account 2), a representation of alert 106A can be include in set of alerts 112A and set of alerts 112C (but not set of alerts 112B). A similar process can be performed as additional alerts are received. In some implementations, where an alert is associated with an attribute for which an associated bucket does not exist in hash table 108, a bucket associated with that attribute can be created for the alert.

For each set of alerts, correlations can be determined. For example, correlations 115 can represent correlations founds for set of alerts 112A. Correlations 115A can indicate correlations between alerts include in set of alerts 112A. In some implementations, correlations 115 can include determining, for each pair of cybersecurity alerts from the set of alerts 112A, whether or not a graph edge associated with that pair of cybersecurity alerts already exists (e.g., at attack graph 114A). Correlations can be determined for each set of alerts, such as correlations for set of alerts 112B and correlations for set of alerts 112C, using a similar process to that of correlations 115A.

Correlations 115A can be used to generate and/or update an attack graph 114A. For example, if a graph edge associated with a pair of cybersecurity alerts already exists at attack graph 114A, another graph edge associated with that pair is not generated at attack graph 114A. On the other hand, if a graph edge associated with a pair of cybersecurity alerts does not yet exist at attack graph 114A, a graph edge associated with that pair is generated at attack graph 114.

In some implementations, through use of correlations (e.g., correlations 115A), the number of alerts presented to a cybersecurity analyst is reduced, the positive signal in the alerts is strengthened (e.g., where the more the same alert is received, the stronger the positive signal becomes, indicating a higher confidence that the problem behind the alert is a real problem and not a false alarm), and/or no data is dropped (compared to a situation where correlations are not used). Moreover, a correlation-based framework is not naturally limited to a specific detection type. For example, signature-based detection such as an Intrusion Detection System (IDS) can be correlated with anomalies from a user behavior and analytics (UEBA) framework.

In some implementations, the attack graph 114A represents potentially all alerts for a single network environment. In some implementations, the attack graph 114A represents all possible paths of attack against a cybersecurity network. In some implementations, the attack graph 114A can represent correlations of alerts from set of alerts 112A. In some implementations, the attack graph 114A can be a direct graph, such as a direct graph where nodes represent network states and edges represent exploits that transform on state into a more compromised state and/or a direct graph where nodes represent pre- or post-conditions of an exploit, and edges represent the consequences of having a pre-condition that enables an exploit post-condition. Although not explicitly shown in FIG. 1, an attack graph can also be generated based on correlations determined from set of alerts 112B and/or an attack graph based on correlations determined from set of alerts 112C.

In some implementations, the attack graph 114A represents an entire attack campaign. The attack campaign may include multiple steps. Different steps in the attack can be represented as different subgraphs in the attack graph 114A. Therefore, in some implementations, subgraphs (e.g., each subgraph representing a step of an attack campaign) can be determined based on the attack graph 114A, such as subgraph 116A, subgraph 116B, and/or the like. Although not explicitly shown in FIG. 1, subgraphs can also be determined based on an attack graph associated with set of alerts 112B and/or an attack graph associated with set of alerts 112C.

In some implementations, a maliciousness scores can be determined for one or more subgraphs, such as a separate maliciousness score for each subgraph. The maliciousness score for a subgraph can indicate, in some implementations, a cybersecurity risk posed by the potential cyberattack step associated the subgraph. Where multiple subgraphs have been determined for an attack graph, multiple maliciousness scores can be determined. The maliciousness score can be any score indicating maliciousness for a subgraph. For example, the maliciousness score can be a value between a first value (e.g., 0) and a second value (e.g., 100), where a lower value indicates less maliciousness and a higher value indicates more maliciousness. As another example, the maliciousness score can be text, such as a "no maliciousness", "some maliciousness", or "a lot of maliciousness."

In some implementations, a maliciousness score being outside a predetermined acceptable range can cause a remedial action to occur (or to be triggered). In some implementations, where multiple maliciousness scores are determined for an attack graph, a result that is a function of (e.g., sum, weighted average, etc.) the multiple maliciousness scores can be determined; the result being outside the predetermined acceptable range can cause a remedial action to occur (or to be triggered). An example of a remedial action is sending a signal to a compute device (not shown in FIG. 1) associated with a cybersecurity analyst for further investigation. The signal can include representations of, for example, the maliciousness score(s), set of alerts, attack graph, and/or any other relevant data that could be useful for a cybersecurity analyst to know for evaluating a potential cybersecurity risk. Another example of a remedial action is causing the set of alerts, correlations, attack graph, and/or subgraphs to be stored in a memory (e.g., for further investigation). Another example of a remedial action is causing certain actions at user compute device 140 to be performed (e.g., logging off, running a cybersecurity defense program, logging additional data, etc.), blocking certain actions from being performed at user compute device 140 (e.g., logging off, running third party software, using the internet, downloading additional file, etc.) and/or blocking certain messages from being received from user compute device 140 (e.g., filtering or quarantining messages and/or files send from user compute device 140).

The processors (e.g., processor 102 and/or those included in user compute device 140) can be, for example, a hardware-based integrated circuit (IC) or any other suitable processing device configured to run and/or execute a set of instructions or code. For example, the processors can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processors can be configured to run any of the methods and/or portions of methods discussed herein.

The memories (e.g., memory 104 and/or those included in memory 104) can be, for example, a random-access memory (RAM), a memory buffer, a hard drive, a read-only memory (ROM), an erasable programmable read-only memory (EPROM), and/or the like. The memories can be configured to store any data used by the processors to perform the techniques (methods, processes, etc.) discussed herein. In some instances, the memories can store, for example, one or more software programs and/or code that can include instructions to cause the processors to perform one or more processes, functions, and/or the like. In some implementations, the memories can include extendible storage units that can be added and used incrementally. In some implementations, the memories can be a portable memory (for example, a flash drive, a portable hard disk, and/or the like) that can be operatively coupled to the processors. In some instances, the memories can be remotely operatively coupled with a compute device (not shown in FIG. 1).

Although not shown in FIG. 1, in some implementations, a hash table (e.g., different than hash table 108) is maintained to map times/dates to alerts. Said similarly, a hash table can be maintained that links each alert (e.g., alert 106A) to a time when that alert was generated and/or received. Memory can be cleaned through deleting alerts that were received and/or generated after a predetermined period of time. Additionally, as new alerts are received and/or generated, an identifier for that alert can be determined (e.g., concatenating and/or hashing attributes of the alert such as IP address, user account, description, customer name, etc.). Those alerts can be compared to alerts already included in the hash table. In some implementations, if a newly received and/or generated alert is already included in the hash table, the newly received alert and the pre-existing alert can be merged together and the time/date updated accordingly (taking on the later time/date). In some instances, using a hash map to perform steps, such as deleting alerts or merging alerts, can better ensure consistent look up time, reduce memory requirements, avoid having to perform template extraction, and/or the like.

Figure 2A:
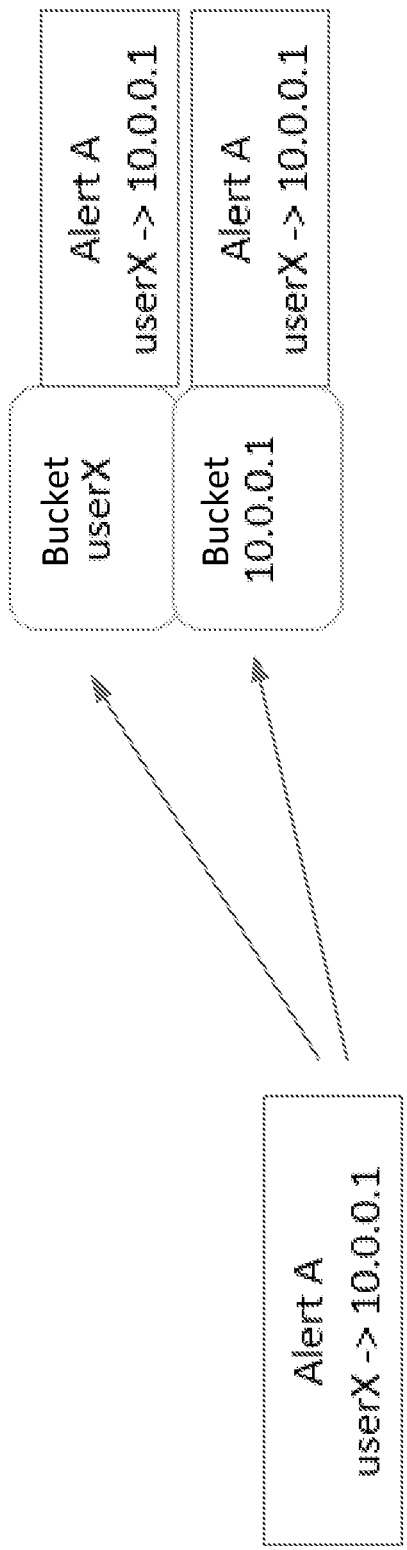
FIGS. 2A-2C illustrate associating alerts to buckets, according to an embodiment.
Figure 2B:
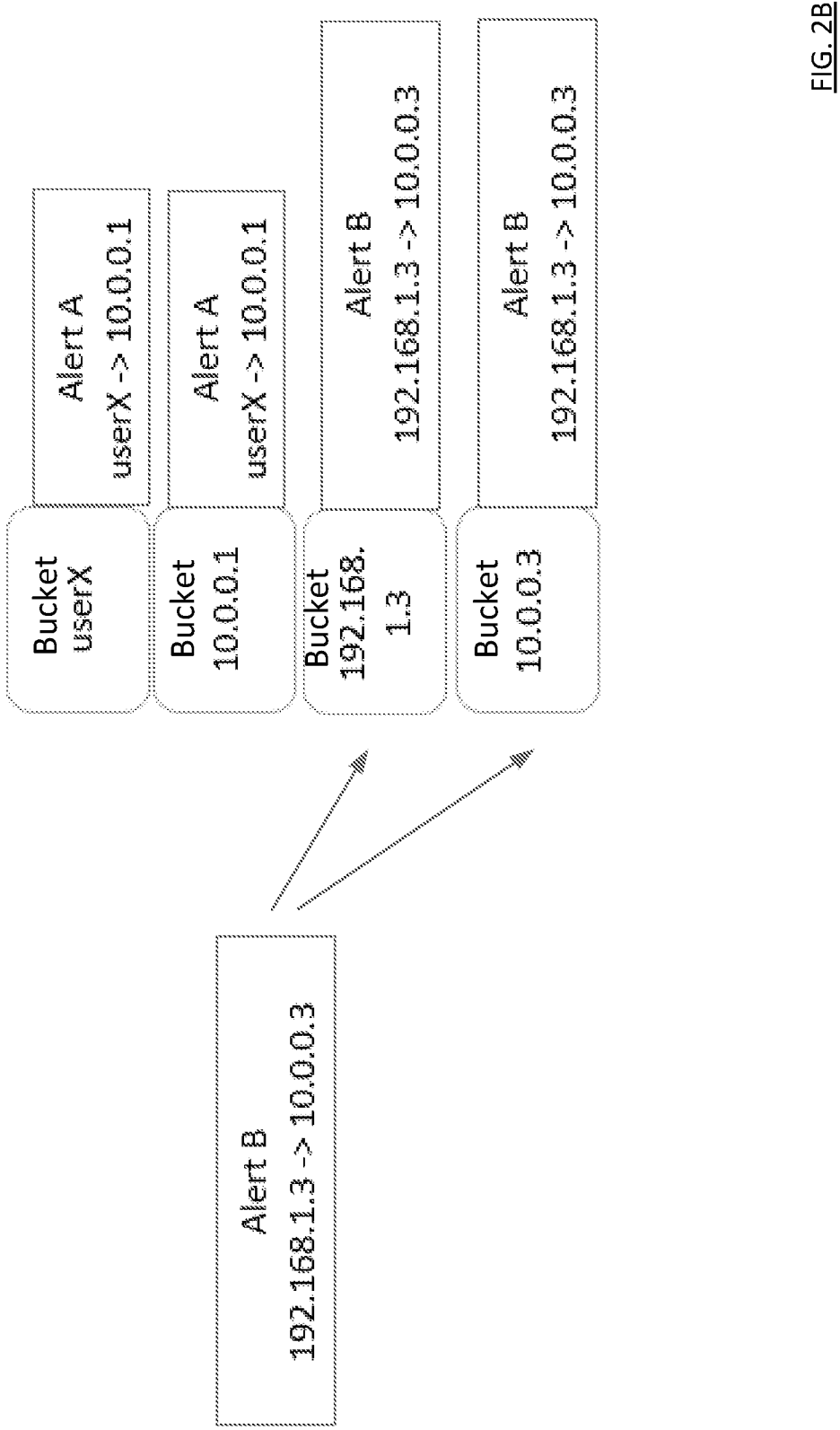
Figure 2C:
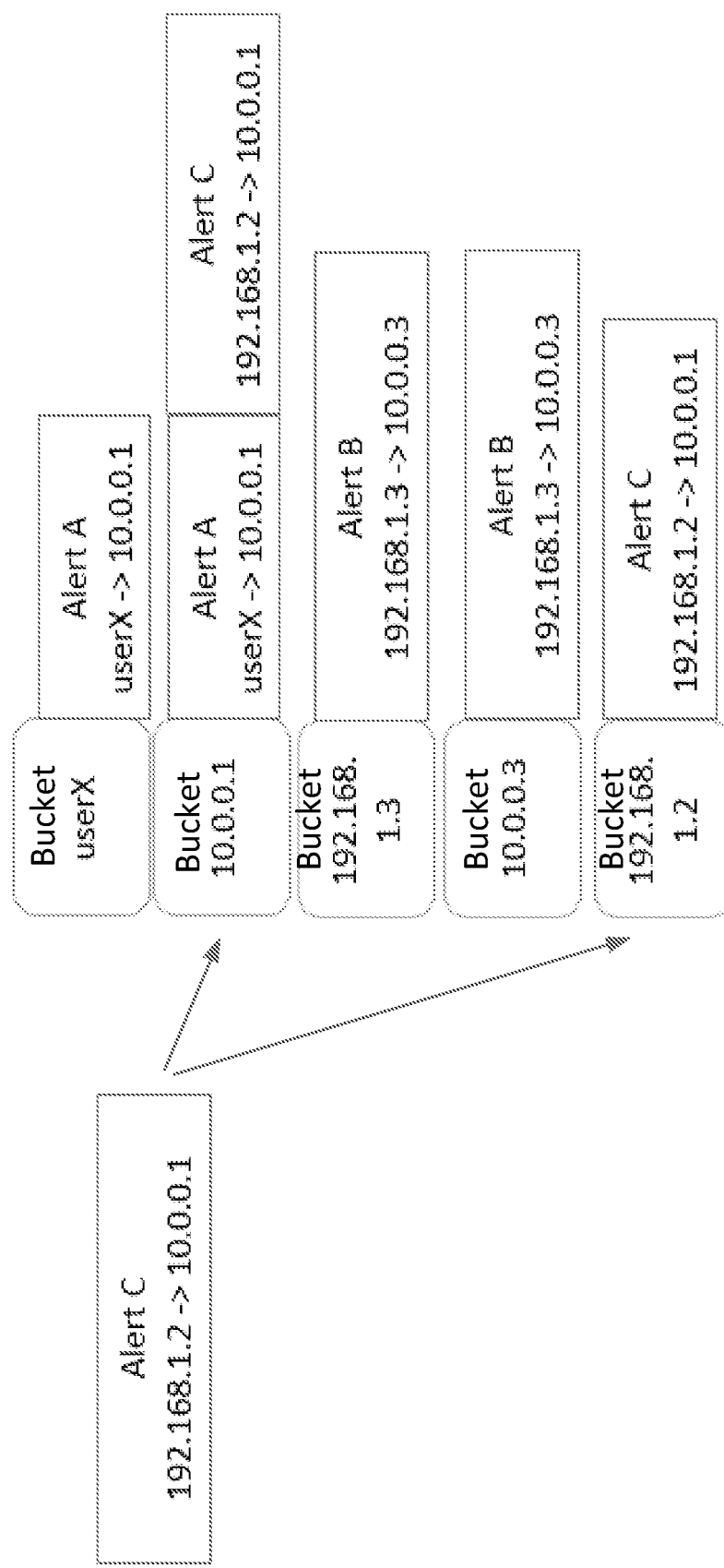

FIGS. 2A-2C illustrate associating alerts to buckets, according to an embodiment. As shown in FIG. 2A, Alert A is a first alert received (e.g., at cybersecurity compute device 100 and from a compute device from user compute device 140) at a first time. Alert A is associated with user account userX (a first attribute) and IP address 10.0.0.1 (a second attribute). For example, a user may have caused Alert A to be generated using a compute device operating under IP address 10.0.0.1 while logged into user account userX. Bucket userX can be generated to hold all alerts with attribute userX, including Alert A. Bucket 10.0.0.1 can also be generated to hold all alerts with attribute 10.0.0.1, including Alert A.

As shown in FIG. 2B, Alert B is a second alert received at a second time after the first time. Alert B is associated with user account IP address 192.168.1.3 and IP address 10.0.0.3. Because buckets associated with 192.168.1.3 and 10.0.0.3 do not yet exist, Bucket 192.168.1.3 can be generated to hold all alerts with attribute 192.168.1.3, including Alert B, as well as Bucket 10.0.0.3 to hold all alerts with attribute 10.0.0.3, including Alert B.

As shown in FIG. 2C, Alert C is a third alert received at a third time after the first time and the second time. Alert C is associated with user account IP address 192.168.1.2 and IP address 10.0.0.1. Because a bucket associated with 192.168.1.2 do not yet exist, Bucket 192.168.1.2 can be generated to hold all alerts with attribute 192.168.1.2, including Alert C. Because a bucket associated with attribute 10.0.0.1 already exists, the set of alerts associated with Bucket 10.0.0.1 can be updated to also include Alert C. Therefore, Bucket 10.0.0.1 includes Alert A and Alert C.

Figure 2D:
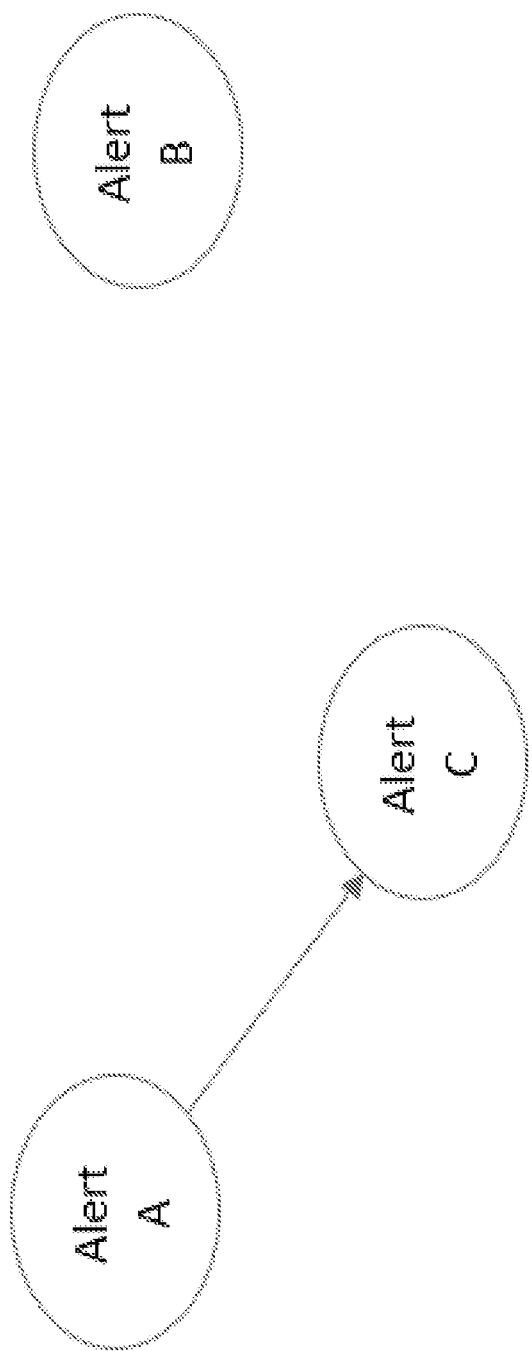
FIG. 2D illustrates an example of an attack graph, according to an embodiment.

FIG. 2D illustrates an example of an attack graph (e.g., attack graph 114A), according to an embodiment. As shown in FIG. 2D, Alert A and Alert C can be tested for correlation because Bucket 10.0.0.1 includes both alerts. If the correlation test indicated correlation, an edge connecting Alerts A and C can be added to an attack graph (associated with Bucket 10.0.0.1). Note that Alert B is not tested for correlation with Alert A because Alerts A and B fall into different buckets. Therefore, instead of doing three correlation tests (A and B, A and C, B and C), a single correlation test is performed (A and C). This can reduce processing burden, and in some instances, cause attacks to be identified faster (e.g., because maliciousness scores can be determined faster).

Such a process as described with respect to FIG. 2A-2D can continue to be performed as additional alerts are received. As additional alerts are received and associated to buckets and/or cause generation of new buckets, correlations can repeatedly be tested for to generate and/or update an attack graph.

In some implementations, alerts can be deleted from one or more sets of alerts (as related to one or more buckets). In some implementations, buckets are portions of a hash table (e.g., hash table 108), and the one or more sets of alerts are deleted by removing them from the hash table. For example, alerts received, generated, and/or included in a bucket prior to a predetermined time (e.g., one day ago, one week ago, one month ago, etc.) can be deleted. As another example, when a set of alerts for a bucket includes a number of alerts greater than a predetermined threshold number, alerts can be deleted (e.g., starting with the older alerts) such that the number of alerts is not greater than the predetermined threshold number.

Figure 3:
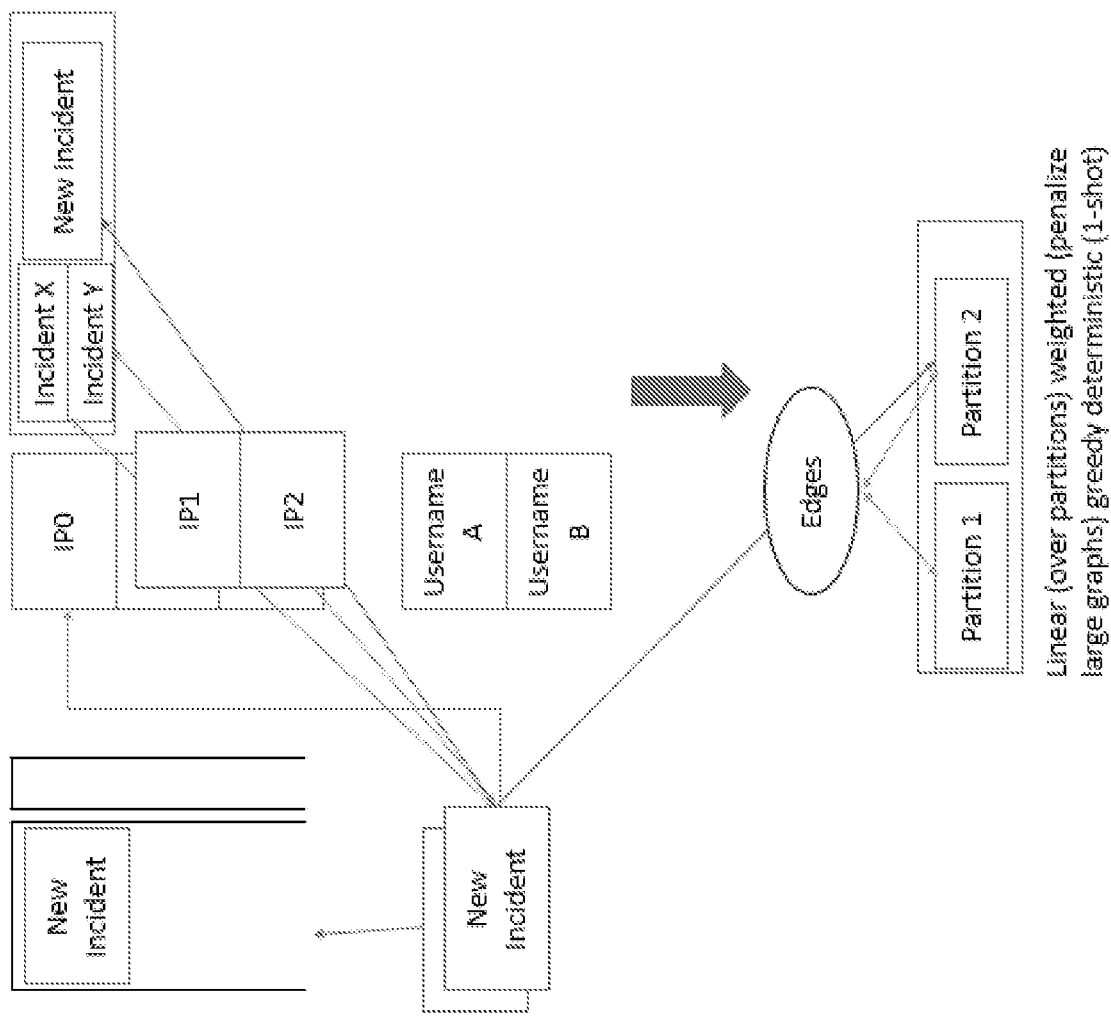
FIG. 3 shows a diagram illustrating the deletion of old alerts, according to an embodiment.

FIG. 3 shows a diagram illustrating the deletion of old alerts, according to an embodiment. A new incident associated with IP address represented as IPO can be associated to a bucket associated with IP address IPO. Additionally, previous incidents X and Y (associated with IPO) may have been received and/or determined in the past at an amount of time greater than a predetermined threshold (e.g., one day ago). As such, incidents X and Y can be removed/deleted from bucket IPO. Therefore, when determining correlations and/or the attack graph for bucket IPO, the new incident is considered while incidents X and Y are not.

Figure 4B:
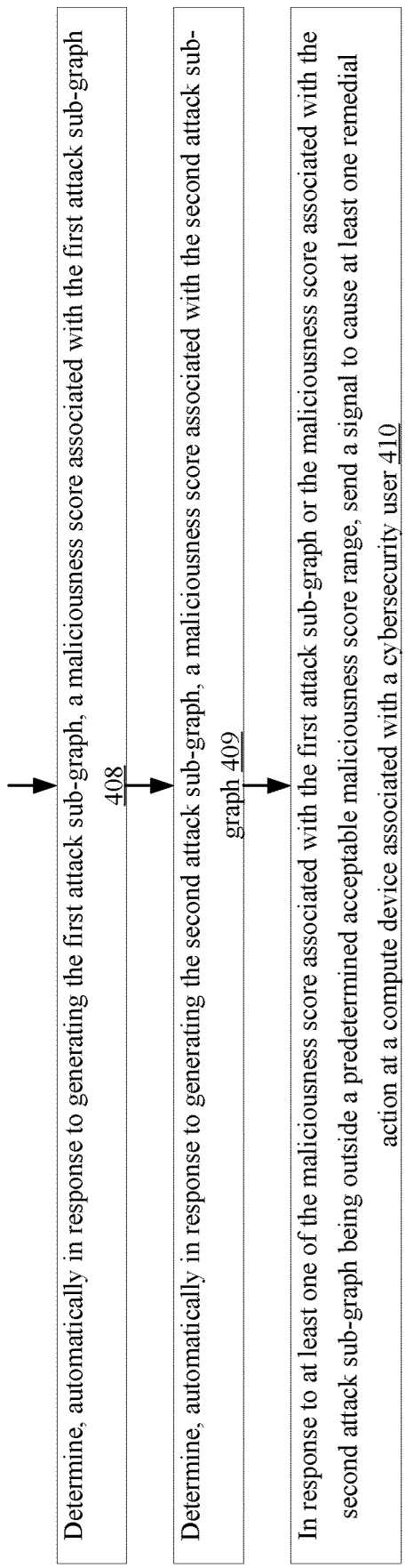

FIGS. 4A-4B show a flowchart of a method 400 for identifying attack subgraphs from an attack graph, according to an embodiment. In some implementations, method 400 is performed by a processor (e.g., processor 102). In some implementations, the steps of method 400 are performed in real time or substantially real time (e.g., at machine speed).

At 401, a cybersecurity alert (e.g., alert 106A or alert 106B) associated with an attribute is received. For example, the cybersecurity alert can be received at cybersecurity compute device 100 from a user compute device included in user compute devices 140. Examples of attributes include user account, IP address, description, customer name, alert type, location, time, device type, and/or the like. At 402, a bucket (e.g., bucket 110A) from a hash table (e.g., hash table 108) and associated with the attribute is identified automatically (e.g., without requiring human intervention) in response to receiving the cybersecurity alert associated with the attribute.

At 403, a set of cybersecurity alerts (e.g., set of alerts 112A) associated with the bucket are updated, automatically (e.g., without requiring human intervention) in response to identifying the bucket from the hash table, to generate an updated set of cybersecurity alerts associated with the bucket. The set of cybersecurity alerts associated with the bucket do not include the cybersecurity alert. The updated set of cybersecurity alerts associated with the bucket include the cybersecurity alert.

At 404, a set of correlations (e.g., correlations 115A) between cybersecurity alerts included in the updated set of cybersecurity alerts associated with the bucket are identified automatically (e.g., without requiring human intervention) in response to updating at 403. At 405, an attack graph (e.g., attack graph 114A) is generated based on the set of correlations and automatically (e.g., without requiring human intervention) in response to identifying the set of correlations.

At 406, a first attack subgraph (e.g., subgraph 116A) is identified from the attack graph automatically (e.g., without requiring human intervention) in response to generating the attack graph. At 407, a second attack subgraph (e.g., subgraph 116B) is identified from the attack graph automatically in response to generating the attack graph.

At 408, a maliciousness score associated with the first attack subgraph is determined automatically (e.g., without requiring human intervention) in response to generating the first attack subgraph. At 409, a maliciousness score associated with the second attack subgraph is determined automatically (e.g., without requiring human intervention) in response to generating the second attack subgraph.

At 410, in response to at least one of the maliciousness score associated with the first attack subgraph or the maliciousness score associated with the second attack subgraph being outside a predetermined acceptable maliciousness score range, a signal (e.g., electronic signal) is sent to cause at least one remedial action at a compute device (e.g., cybersecurity compute device 100, user compute device from user compute device 140, a compute device not shown in FIG. 1, etc.) associated with a cybersecurity user (e.g., hacker, cybersecurity analyst, software engineer, etc.). For example, cybersecurity compute device 100 can send an electronic signal to one or more user compute devices from user compute devices 140, a remote compute device (not shown in FIG. 1) associated with a cybersecurity analyst, and/or compute devices being protected by the cybersecurity analyst (e.g., company employees separate from the internet technician/cybersecurity analysts). Examples of remedial actions causing certain actions at user compute devices 140 to be performed (e.g., logging off, running a cybersecurity defense program, logging additional data, etc.) and/or preventing certain actions user compute devices 140 from being performed (e.g., logging off, running third party software, using the internet, downloading additional file, etc.). In some implementations, the at least one remedial action occurs at the same compute device that performs 401-409. For example, the cybersecurity compute device 100 can update a blacklist or whitelist, filter messages or files, run a cybersecurity defense software, log data, force user accounts to log out, and/or the like.

In some implementations of method 400, the cybersecurity alert is a first cybersecurity alert, the first cybersecurity alert is received at a first time, the attribute is a first attribute, the bucket is a first bucket, the set of correlations is a first set of correlations, the attack graph is a first attack graph, the signal is a first signal, and the at least one remedial action is at least one first remedial action. Furthermore, method 400 includes receiving a second cybersecurity alert (e.g., alert 106B) at a second time after the first time. The second cybersecurity alert is associated with a second attribute different than the first attribute (e.g., a different IP address, a different user account, etc.). Method 400 further includes identifying, automatically (e.g., without human intervention) in response to receiving the second cybersecurity alert, a second bucket (e.g., bucket 110B) from the hash table. The second bucket is associated with the second attribute. The second bucket is different than the first bucket. Method 400 further includes updating a set of cybersecurity alerts (e.g., set of alerts 112B) associated with the second bucket to generate an updated set of cybersecurity alerts associated with the second bucket. The set of cybersecurity alerts associated with the second bucket do not include the second cybersecurity alert. The updated set of cybersecurity alerts associated with the second bucket include the second cybersecurity alert. Method 400 further includes identifying a second set of correlations between cybersecurity alerts included in the updated set of cybersecurity alerts associated with the second bucket. Method 400 further includes generating a second attack graph based on the second set of correlations. Method 400 further includes identifying a third attack subgraph from the second attack graph. Method 400 further includes identifying a fourth attack subgraph from the second attack graph. Method 400 further includes determining a maliciousness score associated with the third attack subgraph. Method 400 further includes determining a maliciousness score associated with the fourth attack subgraph. Method 400 further includes, in response to the maliciousness score associated with the third attack subgraph and/or the maliciousness score associated with the fourth attack subgraph being outside the predetermined acceptable maliciousness score range, sending a second signal to cause at least one second remedial action at the compute device associated with the cybersecurity user.

In some implementations of method 400, the cybersecurity alert is a first cybersecurity alert, the first cybersecurity alert is received at a first time, the set of correlations is a first set of correlations, the attack graph is a first attack graph, the signal is a first signal, and the at least one remedial action is at least one first remedial action. Method 400 further includes receiving a second cybersecurity alert (e.g., alert 106B) at a second time after the first time. The second cybersecurity alert is associated with the attribute. Said similarly, the first cybersecurity alert and the second cybersecurity alert share a common attribute (e.g., common user name, common IP address, etc.). Method 400 further includes updating, automatically in response to receiving the second cybersecurity alert, the updated set of cybersecurity alerts associated with the bucket to generate a further updated set of cybersecurity alerts associated with the bucket. The updated set of cybersecurity alerts associated with the bucket do not include the second cybersecurity alert. The further updated set of cybersecurity alerts associated with the bucket do include the second cybersecurity alert. Method 400 further includes identifying a second set of correlations between cybersecurity alerts included in the further updated set of cybersecurity alerts associated with the bucket. Method 400 further includes generating a second attack graph based on the second set of correlations. Method 400 further includes identifying a third attack subgraph from the second attack graph. Method 400 further includes identifying a fourth attack subgraph from the second attack graph. Method 400 further includes determining a maliciousness score associated with the third attack subgraph. Method 400 further includes determining a maliciousness score associated with the fourth attack subgraph. Method 400 further includes, in response to at least one of the maliciousness score associated with the third attack subgraph or the maliciousness score associated with the fourth attack subgraph being outside the predetermined acceptable maliciousness score range, sending a second signal to cause at least one second remedial action at the compute device associated with the cybersecurity user.

In some implementations of method 400, the cybersecurity alert is a first cybersecurity alert, the first cybersecurity alert is received at a first time, the attribute is a first attribute, the bucket is a first bucket, the hash table is a first hash table, the set of correlations is a first set of correlations, the attack graph is a first attack graph, the signal is a first signal, and the at least one remedial action is at least one first remedial action. Method 400 further includes receiving a second cybersecurity alert at a second time after the first time. The second cybersecurity alert associated with a second attribute different than the first attribute. Method 400 further includes identifying, automatically (e.g., without human intervention) in response to receiving the second cybersecurity alert, a second bucket from a second hash table. The second bucket is associated with the second attribute. The second bucket is different than the first bucket. The second hash table is different than the first hash table. For example, the first hash table can include buckets associated with IP addresses (and not user accounts), and the second hash table can include buckets associated with user accounts (and not IP address). Method 400 further includes updating a set of cybersecurity alerts associated with the second bucket to generate an updated set of cybersecurity alerts associated with the second bucket. The set of cybersecurity alerts associated with the second bucket do not include the second cybersecurity alert. The updated set of cybersecurity alerts associated with the second bucket include the second cybersecurity alert. Method 400 further includes identifying a second set of correlations between cybersecurity alerts included in the updated set of cybersecurity alerts associated with the second bucket. Method 400 further includes generating a second attack graph based on the second set of correlations. Method 400 further includes identifying a third attack subgraph from the second attack graph. Method 400 further includes identifying a fourth attack subgraph from the second attack graph. Method 400 further includes determining a maliciousness score associated with the third attack subgraph. Method 400 further includes determining a maliciousness score associated with the fourth attack subgraph. Method 400 further includes, in response to at least one of the maliciousness score associated with the third attack subgraph or the maliciousness score associated with the fourth attack subgraph being outside the predetermined acceptable maliciousness score range, sending a second signal to cause at least one second remedial action at the compute device associated with the cybersecurity user.

In some implementations of method 400, the attribute is a first attribute, the cybersecurity alert is further associated with a second attribute different than the first attribute, the hash table is a first hash table, the set of correlations is a first set of correlations, the attack graph is a first attack graph, the signal is a first signal, and the at least one remedial action is at least one first remedial action. Method 400 further includes identifying, automatically in response to receiving the cybersecurity alert, a bucket from a second hash table. The bucket from the second hash table is associated with the second attribute. The second hash table is different than the first hash table. For example, the first hash table can include buckets associated with IP addresses (and not user accounts), and the second hash table can include buckets associated with user accounts (and not IP address). Method 400 further includes updating a set of cybersecurity alerts associated with the bucket from the second hash table to generate an updated set of cybersecurity alerts associated with the bucket from the second hash table. The set of cybersecurity alerts associated with the bucket from the second hash table do not include the cybersecurity alert. The updated set of cybersecurity alerts associated with the bucket from the second hash table include the cybersecurity alert. Method 400 further includes identifying a second set of correlations between pairs of cybersecurity alerts included in the updated set of cybersecurity alerts associated with the bucket from the second hash table. Method 400 further includes generating a second attack graph based on the second set of correlations. Method 400 further includes identifying a third attack subgraph from the second attack graph. Method 400 further includes identifying a fourth attack subgraph from the second attack graph. Method 400 further includes determining a maliciousness score associated with the third attack subgraph. Method 400 further includes determining a maliciousness score associated with the fourth attack subgraph. Method 400 further includes, in response to at least one of the maliciousness score associated with the third attack subgraph or the maliciousness score associated with the fourth attack subgraph being outside the predetermined acceptable maliciousness score range, sending a second signal to cause at least one second remedial action at the compute device associated with the cybersecurity user.

In some implementations of method 400, the updated set of cybersecurity alerts associated with the bucket includes at least one cybersecurity alert from the set of cybersecurity alerts associated with the bucket and excludes at least one cybersecurity alert from the set of cybersecurity alerts associated with the bucket.

In some implementations of method 400, updating the set of cybersecurity alerts associated with the bucket to generate the updated set of cybersecurity alerts associated with the bucket causes the updated set of cybersecurity alerts associated with the bucket to include a count of cybersecurity alerts greater than a predetermined threshold. Method 400 further includes deleting at least one cybersecurity alert included in the updated set of cybersecurity alerts associated with the bucket such the count of cybersecurity alerts is less than the predetermined threshold.

Some implementations of method 400 further include updating, at a predetermined period of time after the cybersecurity alert has been received, the updated set of cybersecurity alerts associated with the bucket to generate a modified updated set of cybersecurity alerts associated with the bucket. The modified updated set of cybersecurity alerts associated with the bucket do not include the cybersecurity alert.

In some implementations of method 400, the hash table is a first hash table and the cybersecurity alert is a first cybersecurity alert. Method 400 further includes receiving a second cybersecurity alert. Method 400 further includes determining, in response to receiving the second cybersecurity alert, an identifier associated with the second cybersecurity alert. Method 400 further includes determining that the identifier is not included in a second hash table. Method 400 further includes storing a representation of the identifier in the second hash table.

In some implementations of method 400, the hash table is a first hash table and the cybersecurity alert is a first cybersecurity alert. Method 400 further includes receiving a second cybersecurity alert. Method 400 further includes determining, in response to receiving the second cybersecurity alert, an identifier associated with the second cybersecurity alert. Method 400 further includes determining, using the identifier, that the second cybersecurity alert is included in a bucket of a second hash table, the bucket of the second hash table associated with a third cybersecurity alert. Method 400 further includes merging information associated with the second cybersecurity alert with information associated with the third cybersecurity alert to generate merged cybersecurity alert information that is associated with the bucket of the second hash table.

FIG. 5 shows a flowchart of a method 500 for identifying attack subgraphs from an attack graph, according to an embodiment. In some implementations, method 500 is performed by a processor (e.g., processor 102). In some implementations, the steps of method 500 are performed in real time or substantially real time (e.g., at machine speed).

At 501, a stream of cybersecurity alerts (e.g., alerts 106A and 106B) are received over a period of time. For example, the stream of cybersecurity alerts can include a first cybersecurity alert received at a first time, a second cybersecurity alert received at a second time after the first time, and a third cybersecurity alert received at a third time after the second time, where the first, second, and third time are included in the period of time.

At 502, as each cybersecurity alert from the stream of cybersecurity alerts is received, a bucket (e.g., bucket 110A) associated with that cybersecurity alert is identified (e.g., without requiring human intervention). The bucket is uniquely associated with an attribute (e.g., an IP address or a user name). The cybersecurity alert is associated with the attribute. The bucket is associated with a set of cybersecurity alerts (e.g., set of alerts 112A) that includes that cybersecurity alert.

At 503, as each cybersecurity alert from the stream of cybersecurity alerts is received, a set of correlations (e.g., correlations 115A) between cybersecurity alerts included in the set of cybersecurity alerts are determined, based on the set of cybersecurity alerts, to update an attack graph (e.g., attack graph 114A) associated with the set of cybersecurity alerts. At 504, as each cybersecurity alert from the stream of cybersecurity alerts is received, a set of attack subgraphs (e.g., subgraph 116A, subgraph 116B) from the attack graph are identified.

At 505, as each cybersecurity alert from the stream of cybersecurity alerts is received, a determination is made, for each attack subgraph from the set of attack subgraphs and to generate a set of maliciousness scores, a maliciousness score associated with that attack subgraph. At 506, in response to a maliciousness score from the set of maliciousness scores being outside a predetermined acceptable maliciousness score range, a signal is sent to cause at least one remedial action at a compute device associated with a cybersecurity user.

In some implementations of method 500, the bucket is a first bucket, the attribute is a first attribute, the set of cybersecurity alerts is a first set of cybersecurity alerts, the set of correlations is a first set of correlations, the attack graph is a first attack graph, the set of attack subgraphs is a first set of attack subgraphs, the set of maliciousness scores is a first set of maliciousness scores, the signal is a first signal, and the at least one remedial action is at least one first remedial action. Method 500 further includes receiving a subsequent cybersecurity alert after the period of time. Method 500 further includes identifying a second bucket associated with the subsequent cybersecurity alert. The second bucket is different than the first bucket. The second bucket is uniquely associated with a second attribute different than the first attribute. The subsequent cybersecurity alert is associated with the second attribute. The second bucket is associated with a second set of cybersecurity alerts that includes the second subsequent cybersecurity alert. Method 500 further includes determining, based on the second set of cybersecurity alerts, a second set of correlations between cybersecurity alerts included in the second set of cybersecurity alerts to update a second attack graph associated with the second set of cybersecurity alerts. Method 500 further includes identifying a second set of attack subgraphs from the second attack graph. Method 500 further includes determining, for each attack subgraph from the second set of attack subgraphs and to generate a second set of maliciousness scores, a maliciousness score associated with that attack subgraph. Method 500 further includes, in response to a maliciousness score from the second set of maliciousness scores being outside the predetermined acceptable maliciousness score range, sending a second signal to cause at least one second remedial action at the compute device associated with the cybersecurity user.

In some implementations of method 500, the set of attack subgraphs is a first set of attack subgraphs, the set of maliciousness scores is a first set of maliciousness scores, the signal is a first signal, and the at least one remedial action is at least one first remedial action. Method 500 further includes receiving a subsequent cybersecurity alert after the period of time, the subsequent cybersecurity alert associated with the attribute. Method 500 further includes updating the set of cybersecurity alerts to generate an updated set of cybersecurity alerts that include the set of cybersecurity alerts and the subsequent cybersecurity alert. Method 500 further includes updating the set of correlations based on correlations between cybersecurity alerts included in the updated set of cybersecurity alerts to generate an updated attack graph associated with the updated set of cybersecurity alerts. Method 500 further includes identifying a second set of attack subgraphs from the updated attack graph. Method 500 further includes determining, for each attack subgraph from the second set of attack subgraphs and to generate a second set of maliciousness scores, a maliciousness score associated with that attack subgraph. Method 500 further includes, in response to a maliciousness score from the second set of maliciousness scores being outside the predetermined acceptable maliciousness score range, sending a second signal to cause at least one second remedial action at the compute device associated with the cybersecurity user.

In some implementations of method 500, the cybersecurity user is a cybersecurity analyst, and sending the signal to cause the at least one remedial action at the compute device associated with the cybersecurity analyst includes causing a cybersecurity alert to be provided to the cybersecurity analyst indicating that the maliciousness score from the set of maliciousness scores is outside the predetermined acceptable maliciousness score range.

In some implementations of method 500, the stream of cybersecurity alerts are associated with a computer environment, and sending the signal to cause the at least one remedial action further includes causing a mode of operation of the computer environment to change.

FIG. 6 shows a flowchart of a method 600 for identifying attack subgraphs from an attack graph, according to an embodiment. In some implementations, method 600 is performed by a processor (e.g., processor 102). In some implementations, the steps of method 600 are performed in real time or substantially real time (e.g., at machine speed).

At 601, a stream of cybersecurity alerts (e.g., including alerts 106A and/or 106B) is received. Each cybersecurity alert from the stream of cybersecurity alerts is associated with a set of attributes. In some implementations, the set of attributes include a set of usernames and a set of internet protocol (IP) addresses.

At 602, each cybersecurity alert from the stream of cybersecurity alerts is associated, based on the set of attributes and as that cybersecurity alert is received, to a bucket (e.g., bucket 110A) from a set of buckets. Each bucket from the set of buckets is associated with (1) an attribute from the set of attributes different than remaining buckets from the set of buckets and (2) a set cybersecurity alerts (e.g., set of alerts 112A) from the stream of cybersecurity alerts having the attribute. In some implementations, the set of buckets includes a first subset of buckets associated with a first hash table and a second subset of buckets associated with a second hash table different than the first hash table.

At 603, for each bucket from the set of buckets, a set of correlations (e.g., correlations 115A) between cybersecurity alerts included in the set of cybersecurity alerts for that bucket are determined, based on the set of cybersecurity alerts for that bucket, to generate an attack graph (e.g., attack graph 114A) associated with that bucket. At 604, for each bucket from the set of buckets, the attack graph associated with that bucket is partitioned, based on a linear greedy approach, to determine a set of attack subgraphs (e.g., subgraph 116A, 116B) within the attack graph associated with that bucket. In some implementations, for each bucket from the set of buckets, the attack graph associated with that bucket is not generated based on cybersecurity alerts included in the set of cybersecurity alerts for that bucket that are not correlated.

At 605, for each bucket from the set of buckets, for each attack subgraph from the set of attack subgraphs, and to generate a set of maliciousness scores, a maliciousness score associated with that attack subgraph is determined. At 606, in response to a maliciousness score from the set of maliciousness scores being outside a predetermined acceptable maliciousness score range, a signal (e.g., electronics signal) to cause at least one remedial action is sent.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. An apparatus, comprising:
a memory; and
a processor operatively coupled to the memory, the processor configured to:
receive a cybersecurity alert associated with an attribute;
identify, automatically in response to receiving the cybersecurity alert associated with the attribute, a bucket from a hash table and associated with the attribute;
update, automatically in response to identifying the bucket from the hash table, a set of cybersecurity alerts associated with the bucket to generate an updated set of cybersecurity alerts associated with the bucket, the set of cybersecurity alerts associated with the bucket not including the cybersecurity alert, the updated set of cybersecurity alerts associated with the bucket including the cybersecurity alert and the set of cybersecurity alerts;
identify, automatically in response to updating, a set of correlations between cybersecurity alerts included in the updated set of cybersecurity alerts associated with the bucket;
generate, automatically in response to identifying the set of correlations, an attack graph based on the set of correlations;
identify, automatically in response to generating the attack graph, a first attack subgraph from the attack graph;
identify, automatically in response to generating the attack graph, a second attack subgraph from the attack graph;
determine, automatically in response to generating the first attack subgraph, a maliciousness score associated with the first attack subgraph;
determine, automatically in response to generating the second attack subgraph, a maliciousness score associated with the second attack subgraph; and
in response to at least one of the maliciousness score associated with the first attack subgraph or the maliciousness score associated with the second attack subgraph being outside a predetermined acceptable maliciousness score range, send a signal to cause at least one remedial action at a compute device associated with a cybersecurity user.

2. The apparatus of claim 1, wherein the cybersecurity alert is a first cybersecurity alert, the first cybersecurity alert is received at a first time, the attribute is a first attribute, the bucket is a first bucket, the set of correlations is a first set of correlations, the attack graph is a first attack graph, the signal is a first signal, the at least one remedial action is at least one first remedial action, and the processor is further configured to:
receive a second cybersecurity alert at a second time after the first time, the second cybersecurity alert associated with a second attribute different than the first attribute;
identify, automatically in response to receiving the second cybersecurity alert, a second bucket from the hash table, the second bucket associated with the second attribute, the second bucket different than the first bucket;
update a set of cybersecurity alerts associated with the second bucket to generate an updated set of cybersecurity alerts associated with the second bucket, the set of cybersecurity alerts associated with the second bucket not including the second cybersecurity alert, the updated set of cybersecurity alerts associated with the second bucket including the second cybersecurity alert;
identify a second set of correlations between cybersecurity alerts included in the updated set of cybersecurity alerts associated with the second bucket;

generate a second attack graph based on the second set of correlations;
identify a third attack subgraph from the second attack graph;
identify a fourth attack subgraph from the second attack graph;
determine a maliciousness score associated with the third attack subgraph;
determine a maliciousness score associated with the fourth attack subgraph; and
in response to at least one of the maliciousness score associated with the third attack subgraph or the maliciousness score associated with the fourth attack subgraph being outside the predetermined acceptable maliciousness score range, send a second signal to cause at least one second remedial action at the compute device associated with the cybersecurity user.

3. The apparatus of claim 1, wherein the cybersecurity alert is a first cybersecurity alert, the first cybersecurity alert is received at a first time, the set of correlations is a first set of correlations, the attack graph is a first attack graph, the signal is a first signal, the at least one remedial action is at least one first remedial action, and the processor is further configured to:
receive a second cybersecurity alert at a second time after the first time, the second cybersecurity alert associated with the attribute;
update, automatically in response to receiving the second cybersecurity alert, the updated set of cybersecurity alerts associated with the bucket to generate a further updated set of cybersecurity alerts associated with the bucket, the updated set of cybersecurity alerts associated with the bucket not including the second cybersecurity alert, the further updated set of cybersecurity alerts associated with the bucket including the second cybersecurity alert;
identify a second set of correlations between cybersecurity alerts included in the further updated set of cybersecurity alerts associated with the bucket;
generate a second attack graph based on the second set of correlations;
identify a third attack subgraph from the second attack graph;
identify a fourth attack subgraph from the second attack graph;
determine a maliciousness score associated with the third attack subgraph;
determine a maliciousness score associated with the fourth attack subgraph; and
in response to at least one of the maliciousness score associated with the third attack subgraph or the maliciousness score associated with the fourth attack subgraph being outside the predetermined acceptable maliciousness score range, send a second signal to cause at least one second remedial action at the compute device associated with the cybersecurity user.

4. The apparatus of claim 1, wherein the cybersecurity alert is a first cybersecurity alert, the first cybersecurity alert is received at a first time, the attribute is a first attribute, the bucket is a first bucket, the hash table is a first hash table, the set of correlations is a first set of correlations, the attack graph is a first attack graph, the signal is a first signal, the at least one remedial action is at least one first remedial action, and the processor is further configured to:
receive a second cybersecurity alert at a second time after the first time, the second cybersecurity alert associated with a second attribute different than the first attribute;
identify, automatically in response to receiving the second cybersecurity alert, a second bucket from a second hash table, the second bucket associated with the second attribute, the second bucket different than the first bucket, the second hash table different than the first hash table;
update a set of cybersecurity alerts associated with the second bucket to generate an updated set of cybersecurity alerts associated with the second bucket, the set of cybersecurity alerts associated with the second bucket not including the second cybersecurity alert, the updated set of cybersecurity alerts associated with the second bucket including the second cybersecurity alert;
identify a second set of correlations between cybersecurity alerts included in the updated set of cybersecurity alerts associated with the second bucket;
generate a second attack graph based on the second set of correlations;
identify a third attack subgraph from the second attack graph;
identify a fourth attack subgraph from the second attack graph;
determine a maliciousness score associated with the third attack subgraph;
determine a maliciousness score associated with the fourth attack subgraph; and
in response to at least one of the maliciousness score associated with the third attack subgraph or the maliciousness score associated with the fourth attack subgraph being outside the predetermined acceptable maliciousness score range, send a second signal to cause at least one second remedial action at the compute device associated with the cybersecurity user.

5. The apparatus of claim 1, wherein the attribute is a first attribute, the cybersecurity alert is further associated with a second attribute different than the first attribute, the hash table is a first hash table, the set of correlations is a first set of correlations, the attack graph is a first attack graph, the signal is a first signal, the at least one remedial action is at least one first remedial action, and the processor is further configured to:
identify, automatically in response to receiving the cybersecurity alert, a bucket from a second hash table, the bucket from the second hash table associated with the second attribute, the second hash table different than the first hash table;
update a set of cybersecurity alerts associated with the bucket from the second hash table to generate an updated set of cybersecurity alerts associated with the bucket from the second hash table, the set of cybersecurity alerts associated with the bucket from the second hash table not including the cybersecurity alert, the updated set of cybersecurity alerts associated with the bucket from the second hash table including the cybersecurity alert;
identify a second set of correlations between pairs of cybersecurity alerts included in the updated set of cybersecurity alerts associated with the bucket from the second hash table;
generate a second attack graph based on the second set of correlations;
identify a third attack subgraph from the second attack graph;
identify a fourth attack subgraph from the second attack graph;
determine a maliciousness score associated with the third attack subgraph;

determine a maliciousness score associated with the fourth attack subgraph; and in response to at least one of the maliciousness score associated with the third attack subgraph or the maliciousness score associated with the fourth attack subgraph being outside the predetermined acceptable maliciousness score range, send a second signal to cause at least one second remedial action at the compute device associated with the cybersecurity user.

6. The apparatus of claim 1, wherein the first attack subgraph from the attack graph is identified using a linear greedy approach.

7. The apparatus of claim 1, wherein updating the set of cybersecurity alerts associated with the bucket to generate the updated set of cybersecurity alerts associated with the bucket causes the updated set of cybersecurity alerts associated with the bucket to include a count of cybersecurity alerts greater than a predetermined threshold, the processor further configured to:

delete at least one cybersecurity alert included in the updated set of cybersecurity alerts associated with the bucket such that the count of cybersecurity alerts is less than the predetermined threshold.

8. The apparatus of claim 1, the processor further configured to:

update, at a predetermined period of time after the cybersecurity alert has been received, the updated set of cybersecurity alerts associated with the bucket to generate a modified updated set of cybersecurity alerts associated with the bucket, the modified updated set of cybersecurity alerts associated with the bucket not including the cybersecurity alert.

9. The apparatus of claim 1, wherein the hash table is a first hash table and the cybersecurity alert is a first cybersecurity alert, the processor further configured to:

receive a second cybersecurity alert;
determine, in response to receiving the second cybersecurity alert, an identifier associated with the second cybersecurity alert;
determine that the identifier is not included in a second hash table; and
store a representation of the identifier in the second hash table.

10. The apparatus of claim 1, wherein the hash table is a first hash table and the cybersecurity alert is a first cybersecurity alert, the processor further configured to:

receive a second cybersecurity alert;
determine, in response to receiving the second cybersecurity alert, an identifier associated with the second cybersecurity alert;
determine, using the identifier, that the second cybersecurity alert is included in a bucket of a second hash table, the bucket of the second hash table associated with a third cybersecurity alert; and
merge information associated with the second cybersecurity alert with information associated with the third cybersecurity alert to generate merged cybersecurity alert information that is associated with the bucket of the second hash table.

11. A non-transitory processor-readable medium storing code representing instructions to be executed by one or more processors, the instructions comprising code to cause the one or more processors to:

receive a stream of cybersecurity alerts over a period of time;
as each cybersecurity alert from the stream of cybersecurity alerts is received:

identify a bucket associated with that cybersecurity alert, the bucket uniquely associated with an attribute, the cybersecurity alert associated with the attribute, the bucket associated with a set of cybersecurity alerts that includes that cybersecurity alert,
determine, based on the set of cybersecurity alerts, a set of correlations between cybersecurity alerts included in the set of cybersecurity alerts to update an attack graph associated with the set of cybersecurity alerts,
identify a set of attack subgraphs from the attack graph based on a linear greedy approach, and
determine, for each attack subgraph from the set of attack subgraphs and to generate a set of maliciousness scores, a maliciousness score associated with that attack subgraph; and in response to a maliciousness score from the set of maliciousness scores being outside a predetermined acceptable maliciousness score range, send a signal to cause at least one remedial action at a compute device associated with a cybersecurity user.

12. The non-transitory processor-readable medium of claim 11, wherein the bucket is a first bucket, the attribute is a first attribute, the set of cybersecurity alerts is a first set of cybersecurity alerts, the set of correlations is a first set of correlations, the attack graph is a first attack graph, the set of attack subgraphs is a first set of attack subgraphs, the set of maliciousness scores is a first set of maliciousness scores, the signal is a first signal, the at least one remedial action is at least one first remedial action, and the code further comprises code to cause the one or more processors to:

receive a subsequent cybersecurity alert after the period of time;
identify a second bucket associated with the subsequent cybersecurity alert, the second bucket different than the first bucket, the second bucket uniquely associated with a second attribute different than the first attribute, the subsequent cybersecurity alert associated with the second attribute, the second bucket associated with a second set of cybersecurity alerts that includes the second subsequent cybersecurity alert;
determine, based on the second set of cybersecurity alerts, a second set of correlations between cybersecurity alerts included in the second set of cybersecurity alerts to update a second attack graph associated with the second set of cybersecurity alerts;
identify a second set of attack subgraphs from the second attack graph;
determine, for each attack subgraph from the second set of attack subgraphs and to generate a second set of maliciousness scores, a maliciousness score associated with that attack subgraph; and
in response to a maliciousness score from the second set of maliciousness scores being outside the predetermined acceptable maliciousness score range, send a second signal to cause at least one second remedial action at the compute device associated with the cybersecurity user.

13. The non-transitory processor-readable medium of claim 11, wherein the set of attack subgraphs is a first set of attack subgraphs, the set of maliciousness scores is a first set of maliciousness scores, the signal is a first signal, the at least one remedial action is at least one first remedial action, and the code further comprises code to cause the one or more processors to:

receive a subsequent cybersecurity alert after the period of time, the subsequent cybersecurity alert associated with the attribute;

update the set of cybersecurity alerts to generate an updated set of cybersecurity alerts that include the set of cybersecurity alerts and the subsequent cybersecurity alert;

update the set of correlations based on correlations between cybersecurity alerts included in the updated set of cybersecurity alerts to generate an updated attack graph associated with the updated set of cybersecurity alerts;

identify a second set of attack subgraphs from the updated attack graph;

determine, for each attack subgraph from the second set of attack subgraphs and to generate a second set of maliciousness scores, a maliciousness score associated with that attack subgraph; and in response to a maliciousness score from the second set of maliciousness scores being outside the predetermined acceptable maliciousness score range, send a second signal to cause at least one second remedial action at the compute device associated with the cybersecurity user.

14. The non-transitory processor-readable medium of claim 11, wherein the cybersecurity user is a cybersecurity analyst, and sending the signal to cause the at least one remedial action at the compute device associated with the cybersecurity analyst includes causing a cybersecurity alert to be provided to the cybersecurity analyst indicating that the maliciousness score from the set of maliciousness scores is outside the predetermined acceptable maliciousness score range.

15. The non-transitory processor-readable medium of claim 11, wherein the stream of cybersecurity alerts are associated with a computer environment, and sending the signal to cause the at least one remedial action further includes causing a mode of operation of the computer environment to change.

16. A method, comprising
receiving, via a processor, a stream of cybersecurity alerts, each cybersecurity alert from the stream of cybersecurity alerts associated with a set of attributes;
associating, via the processor and based on the set of attributes, each cybersecurity alert from the stream of cybersecurity alerts, as that cybersecurity alert is received, to a bucket from a set of buckets, each bucket from the set of buckets associated with (1) an attribute from the set of attributes different than remaining buckets from the set of buckets and (2) a set cybersecurity alerts from the stream of cybersecurity alerts having the attribute;

for each bucket from the set of buckets,
determining, via the processor and based on the set of cybersecurity alerts for that bucket, a set of correlations between cybersecurity alerts included in the set of cybersecurity alerts for that bucket to generate an attack graph associated with that bucket, and
partitioning, via the processor and based on a linear greedy approach, the attack graph associated with that bucket to determine a set of attack subgraphs within the attack graph associated with that bucket;

determining, via the processor, for each attack subgraph from the set of attack subgraphs, and to generate a set of maliciousness scores, a maliciousness score associated with that attack subgraph; and in response to a maliciousness score from the set of maliciousness scores being outside a predetermined acceptable maliciousness score range, sending, via the processor, a signal to cause at least one remedial action.

17. The method of claim 16, wherein the set of attributes includes a set of usernames and a set of internet protocol (IP) addresses.

18. The method of claim 16, wherein the set of buckets includes a first subset of buckets associated with a first hash table and a second subset of buckets associated with a second hash table different than the first hash table.

19. The method of claim 16, wherein, for each bucket from the set of buckets, determining the set of correlations amongst the set of cybersecurity alerts for that bucket includes, for each pair of cybersecurity alerts from the set of cybersecurity alerts, whether or not a graph edge is associated with that pair of cybersecurity alerts.

20. The method of claim 16, wherein, for each bucket from the set of buckets, the attack graph associated with that bucket is not generated based on cybersecurity alerts included in the set of cybersecurity alerts for that bucket that are not correlated.

* * * * *

UNITED STATES PATENT AND TRADEMARK OFFICE
CERTIFICATE OF CORRECTION

| | | |
|---|---|---|
| PATENT NO. | : 11,734,423 B1 | Page 1 of 1 |
| APPLICATION NO. | : 18/050398 | |
| DATED | : August 22, 2023 | |
| INVENTOR(S) | : Hazem Mohamed Ahmed Soliman et al. | |

It is certified that error appears in the above-identified patent and that said Letters Patent is hereby corrected as shown below:

In the Specification

Column 10, Line 6, delete "ated with IP address represented as IPO can be associated to" and insert --ated with IP address represented as IP0 can be associated to--

Column 10, Line 7, delete "a bucket associated with IP address IPO. Additionally," and insert --a bucket associated with IP address IP0. Additionally--

Column 10, Line 8, delete "previous incidents X and Y (associated with IPO) may have" and insert --previous incidents X and Y (associated with IP0) may have--

Column 10, Line 12, delete "from bucket IPO. Therefore, when determining correlations" and insert --from bucket IP0. Therefore, when determining correlations--

Column 10, Line 13, delete "and/or the attack graph for bucket IPO, the new incident is" and insert --and/or the attack graph for bucket IP0, the new incident is--

Signed and Sealed this
Fourteenth Day of November, 2023

*Katherine Kelly Vidal*

Katherine Kelly Vidal
*Director of the United States Patent and Trademark Office*